United States Patent [19]

McClendon

[11] 4,250,957

[45] Feb. 17, 1981

[54] HEATING AND COOLING APPARATUS FOR A BUILDING

[76] Inventor: William D. McClendon, 10419 Fernglen Ave., Tujunga, Calif. 91402

[21] Appl. No.: 90,266

[22] Filed: Nov. 1, 1979

[51] Int. Cl.³ ............................ F24J 3/02; F24H 9/14
[52] U.S. Cl. ........................................ 165/45; 165/49; 165/56; 165/169
[58] Field of Search ...................... 165/45, 49, DIG. 6, 165/56, 50, 53; 62/260

[56] References Cited

U.S. PATENT DOCUMENTS

| | | | |
|---|---|---|---|
| 2,000,539 | 5/1935 | Scheide | 165/56 |
| 2,559,868 | 7/1951 | Gay | 165/45 |
| 3,246,689 | 4/1966 | Remde et al. | 165/53 |
| 3,339,629 | 9/1967 | Hervey | 165/45 |
| 3,353,592 | 11/1967 | Di Paolo | 165/53 |
| 3,507,320 | 4/1970 | Russell | 165/50 |
| 3,897,820 | 8/1975 | Teeter, Jr. | 165/56 |

*Primary Examiner*—Sheldon J. Richter
*Attorney, Agent, or Firm*—Jack C. Munro

[57] ABSTRACT

A heating and cooling structural arrangement for a building, such as a house, wherein the interior of the house is caused to assume the temperature of the ground. A liquid reservoir is located in the ground. A pump is to move liquid from the reservoir to a series of panels which are mounted as part of the interior wall structure of the building. If the ground temperature is 70 degrees, this means that the interior temperature of the house should also become 70 degrees. In the winter, the interior of the building would normally be heated and in the summer, the interior of the building would normally be cooled.

5 Claims, 7 Drawing Figures

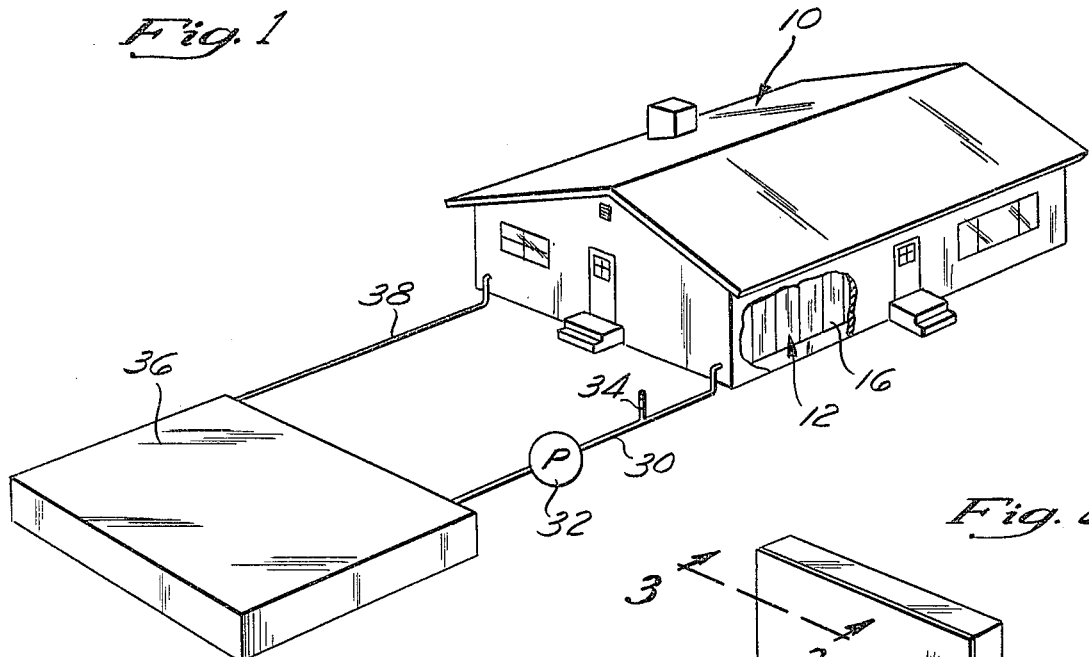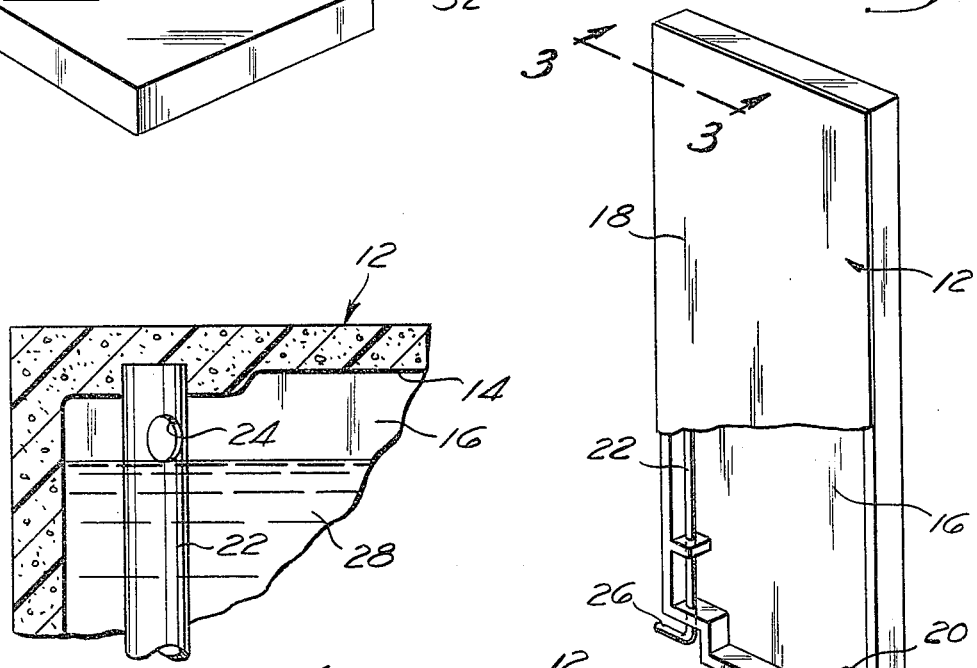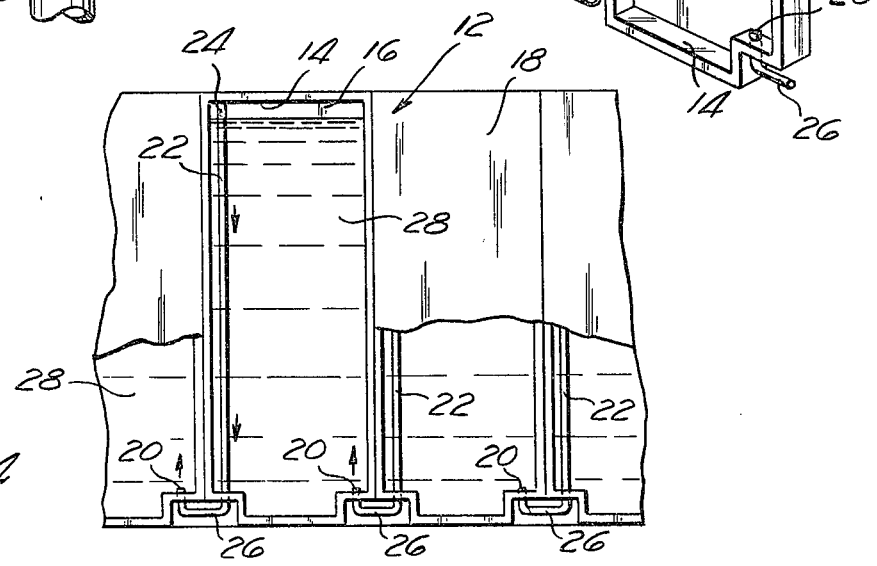

HEATING AND COOLING APPARATUS FOR A BUILDING

BACKGROUND OF THE INVENTION

It is well known that even during the coldest winter, the ground six inches or lower below the surface is substantially at a higher temperature than the outside air. Also, even during the hottest summer, the ground six or more inches below the surface is substantially cooler than the outside air. Geologists consider that the permanent "no change in temperature" begins at five feet below the ground surface. In this era of energy conservation, if some means could be employed to transfer the temperature below the ground to the inside of houses and buildings, that substantially less heating and cooling energy would be required.

Previous to this invention, there has been no known viable structure which could achieve the above-noted objectives. It is to be understood that this invention is not particularly useful in northern climates (Canada, for example) as the ground water is too cold.

SUMMARY OF THE INVENTION

The structure of this invention relates to a system which is to be employed in combination with the ground and with the inside of a building or house. The interior walls of a house or building are to be lined with a plurality of panels. Each panel is hollow and is capable of containing liquid. Each panel has a liquid inlet and a liquid outlet. The liquid outlet of the first panel is connected to the liquid inlet of the second panel and so forth. The liquid inlet of the first panel is supplied liquid by means of a pump which moves the liquid from a liquid reservoir. The liquid in the liquid reservoir is to assume the temperature of the ground. Each of the panels are constructed of heat conducting material so as to transfer the temperature of the water to the air in the house or building. Since it is likely, especially in humid climates, that condensate will collect on the exterior of the panels, located at the lower edge of the assembled panels there is a condensate collector. This condensate collector also functions as the baseboard for the floor of the house or building. This baseboard is to be manually deflectable in order to facilitate cleaning.

The primary objective of this invention is to construct an overall structure which is to be employed in combination with a conventional house or building which is to facilitate heating of the building in times of cold weather and cooling of the building in times of hot weather.

Another objective of this invention is to construct an assemblage of few parts which can be manufactured relatively inexpensively, thereby holding the overall retail cost of the structure as low as possible.

Another objective of this invention is to construct an overall energy saving structure for a house or building which can be readily retrofitted to existing houses or buildings.

BRIEF DESCRIPTION OF THE DRAWINGS

FIG. 1 is an isometric view of the structure of this invention as it would be employed in connection with a house;

FIG. 2 is a partially cut-away, isometric view of a single panel which is to be located as the interior wall of the house or building of FIG. 1;

FIG. 3 is a segmental, cross-sectional view taken along line 3—3 of FIG. 2;

FIG. 4 is a partially cut-away, elevational view of a series of arrangements of the panels shown in FIG. 2 which would be constructed to form the interior wall of the building in FIG. 1;

DETAILED DESCRIPTION OF THE SHOWN EMBODIMENT

Figure 5:
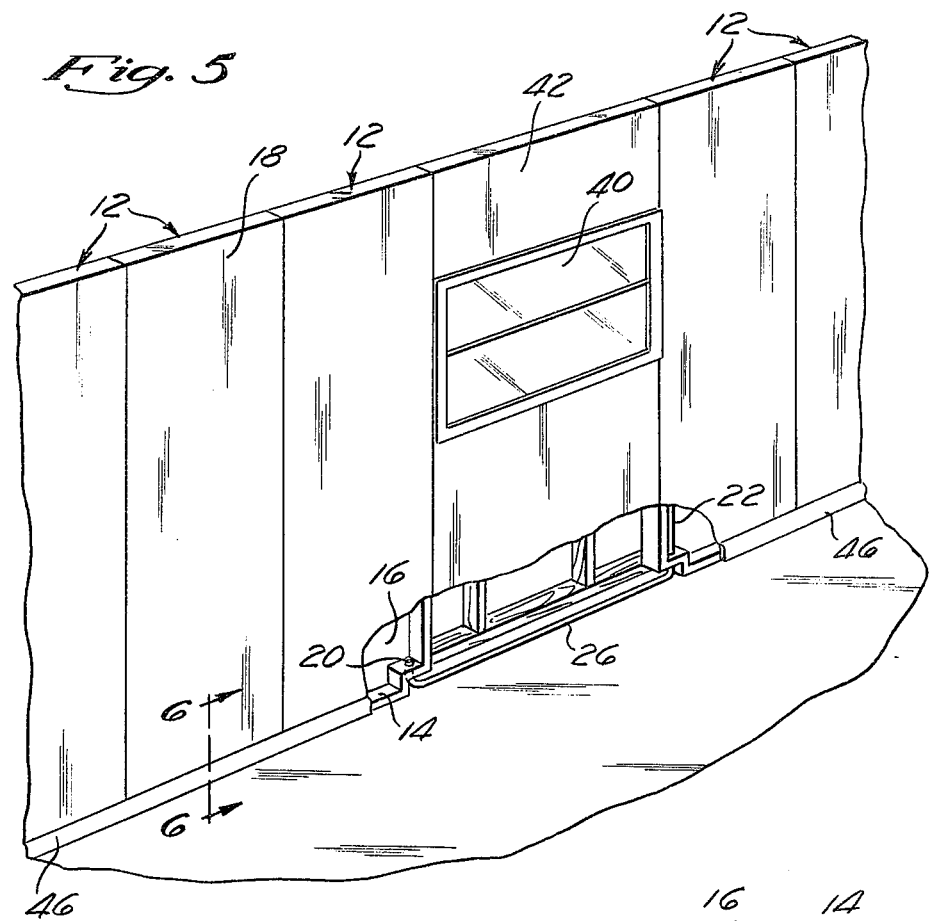
FIG. 5 is a partially cut-away, isometric view of a series of panels forming an interior wall showing how the panel arrangement compensates for window areas in a wall of the house of FIG. 1.
Figure 6:
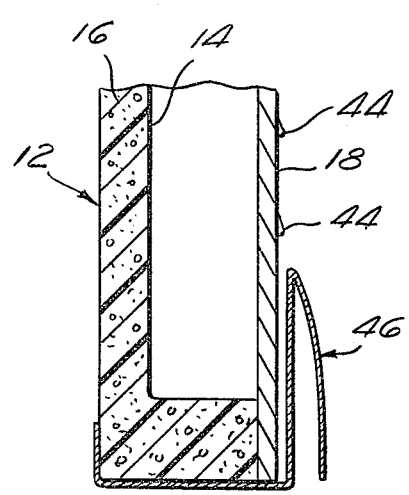
FIG. 6 is a segmental, cross-sectional view taken along line 6—6 of FIG. 5.

Referring particularly to the drawing, there is shown in FIG. 1 a conventional house or building 10 which is constructed on the ground (not shown). The ground has been removed in order to facilitate showing of the entire overall structural arrangement of this invention. The interior walls of the building or house 10 are to include a panel arrangement formed of a series of separate panels 12. Each panel 12 is to be constructed to include an enlarged internal chamber 14. The outer surface 16 of the panel 12 is constructed of a thermally insulated material, such as a plastic foam. The inner surface 18 is to be constructed of a thermally conductive material, such as a metal. The inner surface 18 is to form the interior wall of the house or building 10.

Each panel 12 includes an inlet 20. Also, each panel 12 includes an outlet in the form of an outlet pipe 22. Both the inlet 20 and the outlet pipe 22 are located within the interior chamber 14. The inlet 20 is located adjacent the bottom surface of the interior chamber 14. The outlet pipe 22 includes an opening 24. The opening 24 is located directly adjacent the top surface of the interior chamber 14. The reason for this is because liquid is to be conducted into the bottom of the interior chamber 14 and then must move entirely through the interior chamber 14 to enter into the opening 24 and down the outlet pipe 22. The liquid then moves through a connecting pipe 26 into the inlet 20 of the next panel 12 in series. This is so that the liquid within the chamber 14 is to pass entirely through the length of each panel 12 in order to permit maximum transfer of heat energy from each panel 12 to the interior of the house or building 10. This transfer of heat energy is accomplished primarily by radiation rather than by conduction. Conduction is the conventional mode of heating or cooling within houses of buildings at the present time. The radiation occurs by the air within the house 10 interacting with the surface 18 which has assumed the temperature of the liquid 28 which is located within the interior chamber 14 of each panel 12. There will be a minimal exchange of heat by conduction due to air circulation across the walls.

The first panel 12 in the series of panels that is located within the house 10 is to be connected through a main liquid inlet pipe 30 which extends exteriorly of the house 10. This pipe 30 will normally be located under the ground. The liquid is moved through the pipe 30 by means of a conventional pump 32. In between the pump 32 and the house 10 is located a fluid expansion chamber 34. This expansion chamber 34 is to protect the overall system to compensate for any slight variances in expanding of the liquid 28.

The pump 32 is to receive liquid from the liquid reservoir 36. This liquid reservoir is to be constructed of a thermally conductive wall surface and is to be located in the ground at least six inches below the surface. The last panel in the series of panels in the house 10 is to discharge the liquid into an outlet pipe 38 which in turn returns the liquid to the reservoir 36. The pump 32 and the fluid expansion chamber 34 are deemed to be conventional equipment and are not explained in any specific detail in regard to this invention.

In arranging of the panels 12 in the side-by-side arrangement as shown in FIG. 5, it may be necessary to employ a "dead panel" in order to compensate for windows 40 and also to compensate for different lengths of walls in the house 10. Such a "dead panel" 42 is shown in FIG. 5 which is merely for the purpose of constructing a contiguous surface between the adjacent panels 12. The dead panel 42 is not to contain any liquid and does not function as do the panels 12. The loss of the thermally conductive properties of the dead panels is of little consequence.

In especially humid environments, there will be a tendency for condensate 44 to collect on the exterior of the surface 18. This condensate 44 will have a natural tendency to flow to the lower portion of each panel 12. An elongated plastic member 46 is to be mounted to function as the baseboard of the arranged panels 12. This baseboard 46 is slightly spaced from the surface 18. This slight spacing permits the condensate 44 to pass therebetween and to be collected at the bottom of the member 46. Collected condensate can then be conducted to an appropriate discharge opening and be discharged into the exterior of the house 10 or can be readily dissapated by evaporation. The baseboard 46 is to be manually flexible away from the surface 18 so as to permit entry of appropriate cleaning paraphernalia to facilitate keeping of the condensate collecting section clean.

Figure 7:
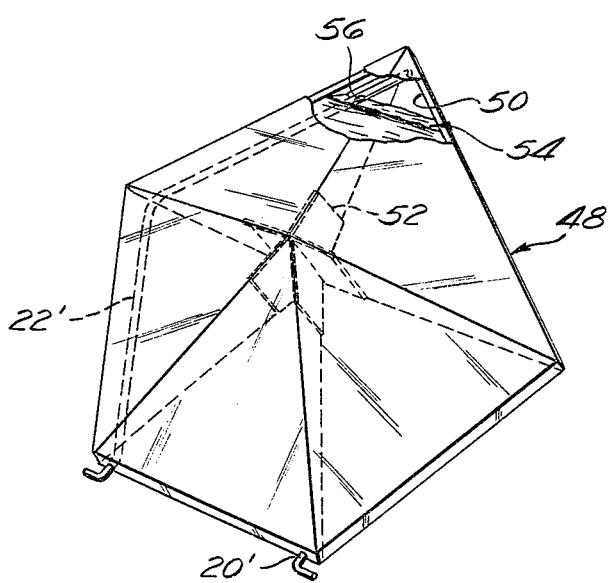
FIG. 7 is an isometric view of a single panel which is formed into a specific shape which is to be used in conjunction with a plurality of other panels to form a geodesic dome building or house.

The structure shown in FIGS. 1–6 is directed in particular to a retrofitting an existing housing structure. It is possible to construct a house or building directly incorporating the panels 12 of this invention. Also, it is possible to construct a building or house into a different shape such as a geodesic dome. Referring particularly to FIG. 7, an example of a type of shaped panel 48 is shown which can be used in the constructing of a geodesic dome. The panel 48 has an interior chamber 50. Within this interior chamber 50 and substantially centrally located therein, is a baffle arrangement 52. Water is to enter into the chamber 50 through inlet 20' and is to be discharged through outlet pipe 22'. The liquid 54 entering the chamber 50 must be conducted from the bottom of the geodesic panel 48 around the baffle 52 and then into the opening 56 formed within the upper end of the pipe 22'.

What is claimed is:

1. In combination with a building, said building being mounted on the ground, said building having an enclosed interior, said interior being enclosed by a side wall assembly, said side wall assembly to include:
   a panel assembly located within said interior, said panel assembly comprising at least one substantially planar panel having an enlarged exterior surface area, said panel being completely enclosed and having an inner chamber, said panel having a top and a bottom, said panel being constructed of a heat conductive material, said inner chamber being adapted to contain a liquid;
   a liquid inlet formed within said panel, a liquid outlet formed within said panel;
   a liquid reservoir located within said ground, said liquid reservoir having a wall structure, said wall structure being heat conductive to thereby cause liquid located within said liquid reservoir to assume substantially the same temperature as said ground;
   p1 pump means located between said liquid reservoir and said panel, said pump means to move a liquid from said liquid reservoir through said inlet into said panel, liquid within said panel to be conducted through said outlet and back to said liquid reservoir; and
   said panel including a condensate collector located adjacent said bottom, said condensate collector to collect condensate which forms on the exterior surface of said panel.

2. The combination as defined in claim 1 wherein:
   said liquid inlet being located adjacent said bottom, said liquid outlet being located adjacent said top, whereby liquid is required to pass entirely through said panel before being conducted from said inlet to said outlet.

3. In combination with a building, said building being mounted on the ground, said building having an enclosed interior, said interior being enclosed by a side wall assembly, said side wall assembly to include:
   a panel assembly located within said interior, said panel assembly comprising at least one substantially planar panel having an enlarged exterior surface area, said panel being completely enclosed and having an inner chamber, said panel having a top and a bottom, said panel being constructed of a heat conductive material, said inner chamber being adapted to contain a liquid;
   a liquid inlet formed within said panel, a liquid outlet formed within said panel;
   a liquid reservoir located within said ground, said liquid reservoir having a wall structure, said wall structure being heat conductive to thereby cause liquid located within said liquid reservoir to assume substantially the same temperature as said ground;
   pump means located between said liquid reservoir and said panel, said pump means to move a liquid from said liquid reservoir through said inlet into said panel, liquid within said panel to be conducted through said outlet and back to said liquid reservoir;
   said panel assembly comprises a plurality of separate panels which are connected together in a series arrangement, whereby an outlet of a said panel is connected directly into the inlet of the next succeeding said panel; and
   said panels being arranged into the shape of a geodesic dome.

4. The combination as defined in claim 3 wherein:
   said liquid inlet being located adjacent said bottom, said liquid outlet being located adjacent said top, whereby liquid is required to pass entirely through said panel before being conducted from said inlet to said outlet.

5. In combination with a building, said building having an enclosed interior, said interior being enclosed by a side wall assembly, said side wall assembly to include:
   a panel assembly located within said interior, said panel assembly comprising at least one substantially planar panel having an enlarged surface area, said panel being completely enclosed and having an inner chamber, said panel having a top and a bottom, said panel being constructed of a heat conductive material, said inner chamber being adapted to contain a liquid;

a liquid inlet formed within said panel, a liquid outlet formed within said panel;

a liquid reservoir located within said ground, said liquid reservoir having a wall structure, said wall structure being heat conductive to thereby cause liquid located within said liquid reservoir to assume substantially the same temperature as said ground;

pump means located between said liquid reservoir and said panel, said pump means to move a liquid from said liquid reservoir through said outlet and back to said liquid reservoir;

said panel assembly comprises a plurality of separate panels which are connected together in a series arrangement, whereby an outlet of said panel is connected directly into the inlet of the next succeeding said panel;

said liquid inlet being located adjacent said bottom, said liquid outlet being located adjacent said top, whereby liquid is required to pass entirely through said panel before being conducted from said inlet to said outlet; and said panel including a condensate collector located adjacent said bottom of said condensate collector to collect condensate which forms on the exterior surface of said panel.

* * * * *